United States Patent
Chiu

(10) Patent No.: US 7,576,601 B2
(45) Date of Patent: Aug. 18, 2009

(54) SLEEP MODE CONTROL CIRCUIT AND METHOD FOR A DC/DC SWITCHING POWER SUPPLY SYSTEM

(75) Inventor: Wei-Che Chiu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 14 days.

(21) Appl. No.: 12/078,488

(22) Filed: Apr. 1, 2008

(65) Prior Publication Data
US 2008/0246448 A1      Oct. 9, 2008

(30) Foreign Application Priority Data
Apr. 4, 2007   (TW) ............................. 96112071 A

(51) Int. Cl.
G05F 1/10   (2006.01)
G05F 3/02   (2006.01)
(52) U.S. Cl. ......................................... 327/544; 327/77
(58) Field of Classification Search .................. 327/544, 327/73, 77, 81
See application file for complete search history.

(56) References Cited

U.S. PATENT DOCUMENTS

| 6,366,066 | B1 * | 4/2002 | Wilcox ........................ 323/282 |
| 6,724,174 | B1 * | 4/2004 | Esteves et al. ............... 323/224 |
| 2008/0030178 | A1 * | 2/2008 | Leonard et al. ............. 323/282 |

* cited by examiner

*Primary Examiner*—Quan Tra
(74) *Attorney, Agent, or Firm*—Rosenberg, Klein & Lee

(57) ABSTRACT

A sleep mode control circuit and method are provided to pull high the error signal of a DC/DC switching power supply system to a target level when the switching power supply system is in a sleep mode, such that the switching power supply system can be more rapidly waked up from the sleep mode to its normal mode once the loading of the switching power supply system increases. A threshold is given for the output signal of the comparator that is used to determine the duty for the switching power supply system, and the error signal in the sleep mode is thus maintained slightly lower than the minimum voltage for the error signal in the normal mode.

8 Claims, 4 Drawing Sheets

SLEEP MODE CONTROL CIRCUIT AND METHOD FOR A DC/DC SWITCHING POWER SUPPLY SYSTEM

FIELD OF THE INVENTION

The present invention is related generally to a DC/DC switching power supply system and, more particularly, to a sleep mode control circuit and method for a DC/DC switching power supply system.

BACKGROUND OF THE INVENTION

A DC/DC switching power supply system feeds back its output voltage to be compared with a reference voltage to generate an error signal, and the error signal is further compared with an oscillating signal such as ramp signal and triangle signal, to determine a duty that is used to regulate the output voltage. For clearer illustration, FIG. 1 shows the corresponding part of a DC/DC switching power supply system, in which a feedback signal FB is derived from the output voltage of the switching power supply, an error amplifier 10 compares the feedback signal FB with a reference signal $V_{ref}$ to produce an error signal comp, and typically a compensation circuit 14 is connected to the output node of the error amplifier 10 to compensate the error signal comp. A comparator 12 compares the error signal comp with an oscillating signal SLOP which is a ramp or triangle signal, and the output signal of the comparator 12 includes the duty information for switching the power switch of the switching power supply. FIG. 2 is a diagram showing an operation region of the error signal comp. For better regulation, the minimum level V1 of the error signal comp. for normal mode operation is usually a non-zero voltage. If the error signal comp is higher than the minimum voltage V1, the switching power supply operates in a Pulse Width Modulation (PWM) mode, and the error signal comp will be compared with the oscillating signal SLOP to determine the duty. If the error signal comp is lower than the minimum voltage V1 for a time interval, the switching power supply will enter a Pulse Frequency Modulation (PFM) mode or sleep mode. In the sleep mode, since the load current is so low that the output voltage of the switching power supply decreases very slowly, the switch cycle of the power switch will be much longer, namely the charge frequency for the output capacitor decreases dramatically. Consequently, the error signal comp continuously goes down and likely becomes much lower than the minimum voltage V1. In this situation, if the switching power supply suffers more loading suddenly, the error signal comp would be difficult to rapidly recover to be higher than the minimum voltage V1, and thereby the switching power supply could not be rapidly waked up from the sleep mode.

SUMMARY OF THE INVENTION

Accordingly, it is an object of the present invention to provide a sleep mode control circuit and method for a DC/DC switching power supply system such that the switching power supply could be rapidly waked up from a sleep mode.

According to the present invention, a sleep mode control circuit for a DC/DC switching power supply system is connected between the output node of the error amplifier and the output node of the comparator of the switching power supply, to monitor the output signal of the comparator when the switching power supply is in a sleep mode, and to pull high the output signal of the comparator to a target level if the output signal of the error amplifier is lower than a threshold.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
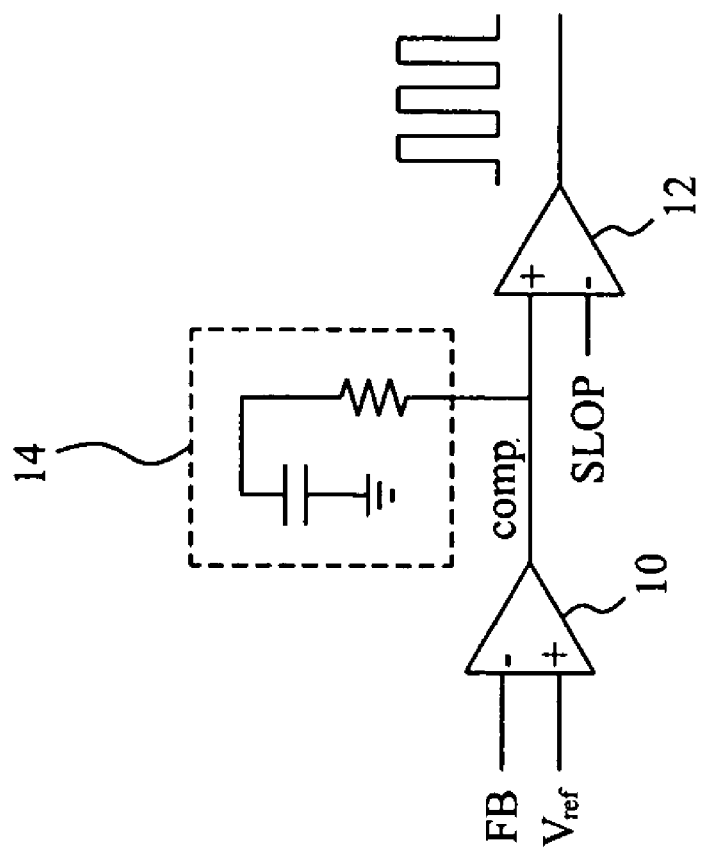
FIG. 1 shows a part of a DC/DC switching power supply system.
Figure 2:
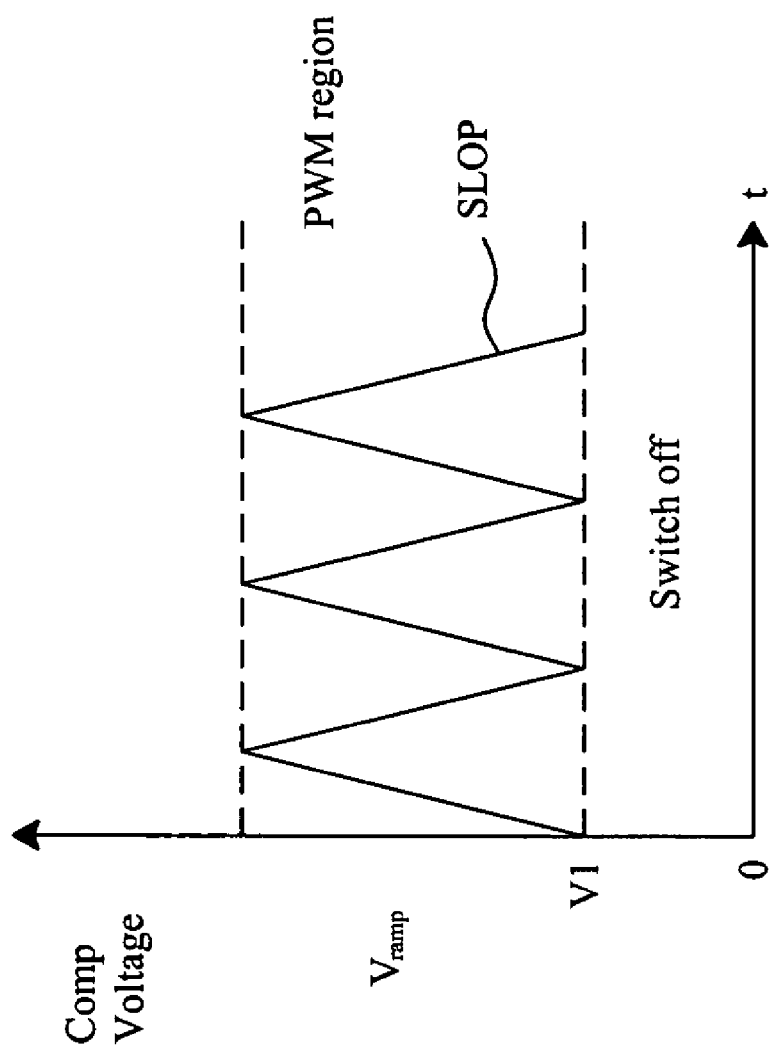
FIG. 2 is a diagram showing an operation region of an error signal of a DC/DC switching power supply system.
Figure 3:
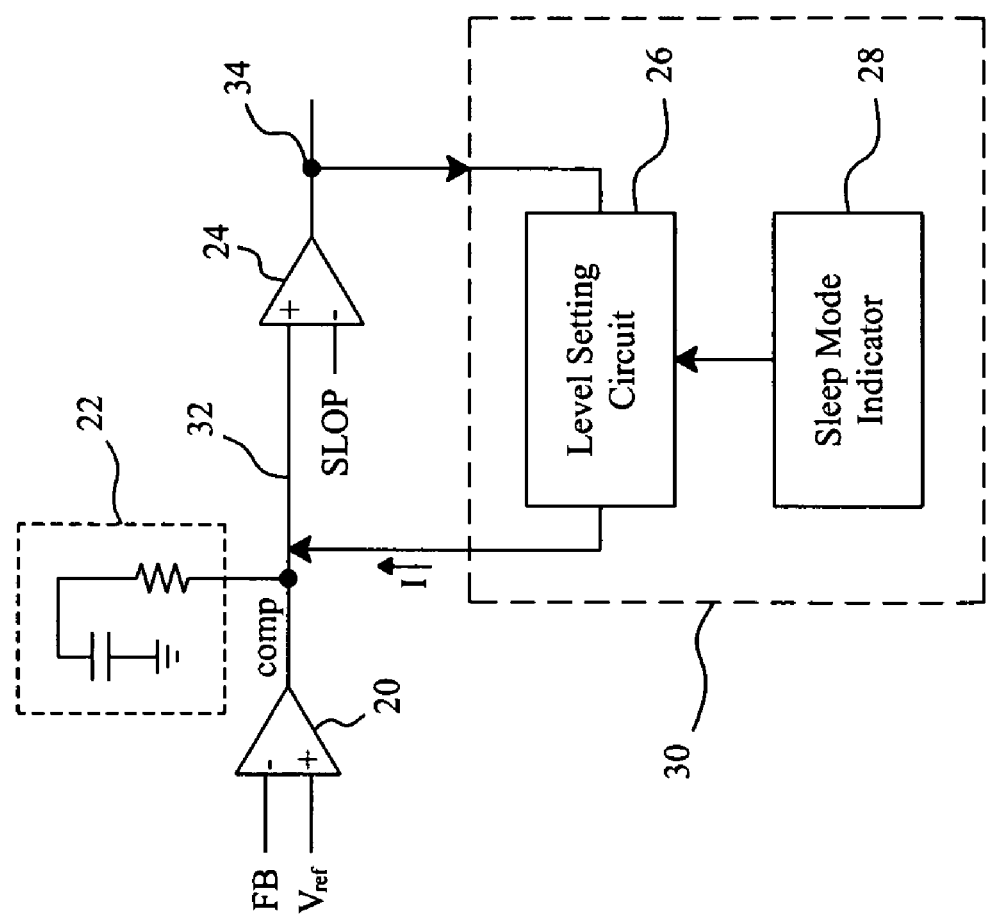
FIG. 3 is an embodiment according to the present invention.

FIG. 3 provides an embodiment according to the present invention, in which as in a typical DC/DC switching power supply system, an error amplifier 20 compares a feedback signal FB derived from the output voltage of the switching power supply with a reference signal $V_{ref}$ to produce an error signal comp on its output node 32, a comparator 24 compares the error signal comp with an oscillating signal SLOP such as a ramp or triangle signal to produce an output signal on its output node 34, and a compensation circuit 22 may be further connected to the output node 32 of the error amplifier 20 to compensate the error signal comp. A sleep mode control circuit 30 is connected between the output node 34 of the comparator 24 and the output node 32 of the error amplifier 20, in which a level setting circuit 26 is enabled by a sleep mode indicator 28 when the switching power supply enters a sleep mode, to pull high the error signal comp to a target level if the output signal 34 is lower than a threshold. The detection of the switching power supply entering a sleep mode may be carried out according to the system design or the user's demand. For example, it may monitor the high-side switch signal or the control signal to switch the high-side switch, and if the high-side and low-side switches are not switched in a preset number of switch cycles, it may conclude that the switching power supply enters a sleep mode. Once the switching power supply enters a sleep mode, the sleep mode indicator 28 will enable the level setting circuit 26, and the level setting circuit 26 will monitor the output signal 34 during the sleep mode. Referring to FIGS. 2 and 3, when the error signal comp is equal to the minimum voltage V1, the output signal 34 will have a corresponding voltage VTR1. When the level setting circuit 26 detects that the output signal 34 falls down to a threshold VL, for example a voltage slightly lower than the voltage VTR1, it may inject a current I into the output node 32 of the error amplifier 20 to pull high the error signal comp to a target level, for example a voltage slightly lower than the minimum voltage V1, and thereby pulling high the output signal 34 to the threshold VL. Since the error signal comp remains close to the minimum voltage V1, it may be rapidly recovered to a level higher than the minimum voltage V1, so that the switching power supply is waked up and returns to its normal mode or PWM mode more rapidly, even a sudden heavy loading occurs. Alternatively, the sleep mode control circuit 30 may inject a current into the compensation circuit 22 to achieve the same effect.

Figure 4:
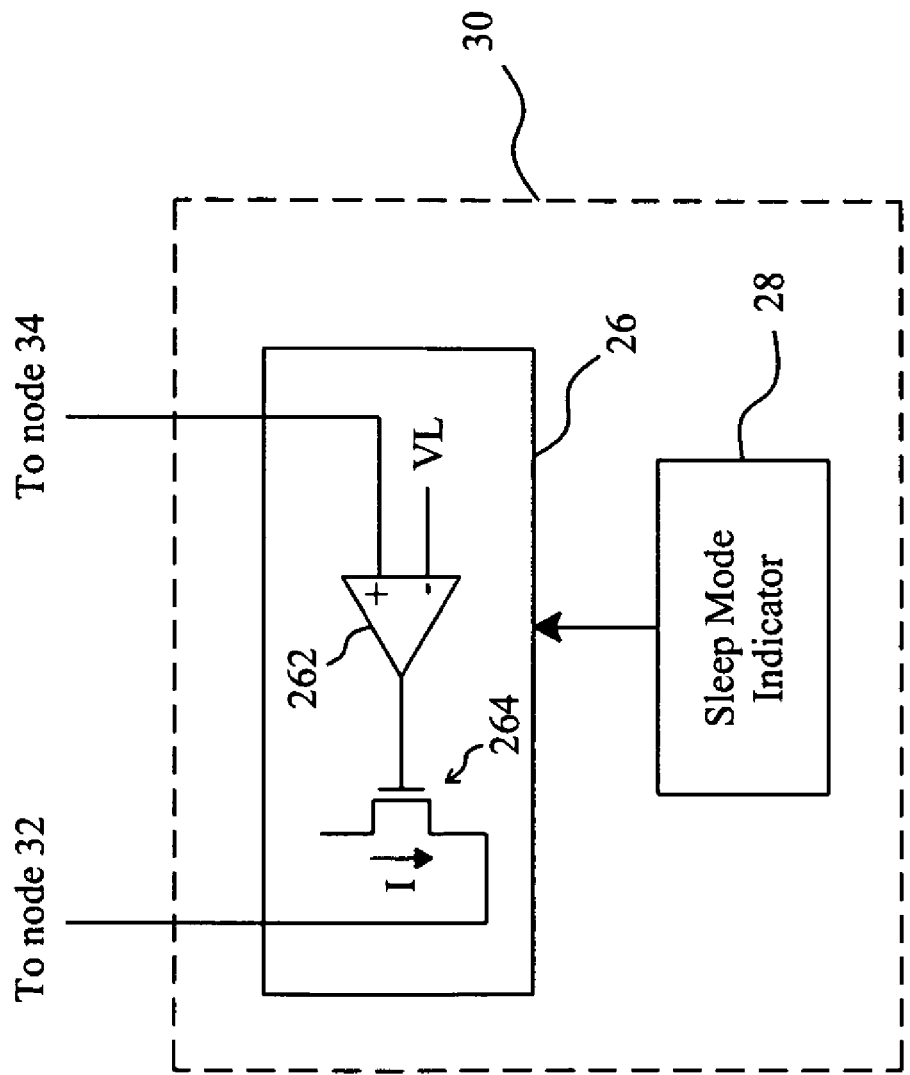
FIG. 4 is an embodiment for the level setting circuit shown in FIG. 3.

FIG. 4 provides an embodiment for the level setting circuit 26 of FIG. 3, in which a comparator 262 compares the output signal 34 with the threshold VL to control the gate of a transistor 264. The source of the transistor 264 is connected to a power source (not shown), for example a current source, and the drain of the transistor 264 is connected to the output node 32 of the error amplifier 20. When the output signal 34 is lower than the threshold VL, the comparator 262 turns on the transistor 264 to inject the current I to the output node 32, thereby maintaining the output signal 34 at the threshold VL. Since the threshold VL is merely slightly lower than VTR1 that is the level of the output signal 34 when the error signal comp is equal to the minimum voltage V1, the error signal comp is consequently maintained at a level slightly lower that the minimum voltage V1, and thereby can rise up to be higher than the minimum voltage V1. Hence, the switching power supply can switch back to its PWM mode from the PFM mode more rapidly.

The sleep mode control circuit and method according to the present invention aim to pull high the error signal comp of a DC/DC switching power supply system in the sleep mode, such that it remains not lower than a level during the sleep mode, and it is thus appreciated that, in addition to the embodiments shown in FIGS. 3 and 4, any other ones having the same function to achieve the same object are also included within the scope of the present invention.

The detection of a switching power supply to enter a sleep mode is a prior art. In addition to the above approach that monitors the high-side switch signal or the control signal to switch the high-side switch, there are many other approaches to determine whether or not a switching power supply enters a sleep mode.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A sleep mode control circuit for a DC/DC switching power supply system including an error amplifier to provide an error signal on its output node, and a comparator to compare the error signal with an oscillating signal to produce an output signal on its output node, the sleep mode control circuit comprising:
   a level setting circuit connected between the output node of the comparator and the output node of the error amplifier, for pulling high the error signal to a target level when the output signal in a sleep mode is lower than a threshold; and
   a sleep mode indicator for enabling the level setting circuit when the switching power supply system enters the sleep mode.

2. The sleep mode control circuit of claim 1, wherein the level setting circuit comprises:
   a transistor connected between a power source and the output node of the error amplifier; and
   a second comparator for turning on the transistor when the output signal in the sleep mode is lower than the threshold, so as to inject a current to the output node of the error amplifier.

3. The sleep mode control circuit of claim 1, wherein the threshold is lower than a level that the output signal will be such that the switching power supply system enters the sleep mode.

4. A sleep mode control circuit for a DC/DC switching power supply system including an error amplifier to provide an error signal on its output node, a compensation circuit connected to the output node of the error amplifier to compensate the error signal, and a comparator to compare the compensated error signal with an oscillating signal to produce an output signal on its output node, the sleep mode control circuit comprising:
   a level setting circuit connected between the output node of the comparator and the compensation circuit, for injecting a circuit into the compensation circuit to pull high the error signal to a target level when the output signal in a sleep mode is lower than a threshold; and
   a sleep mode indicator for enabling the level setting circuit when the switching power supply system enters the sleep mode.

5. The sleep mode control circuit of claim 4, wherein the level setting circuit comprises:
   a transistor connected between a power source and the output node of the error amplifier; and
   a second comparator for turning on the transistor when the output signal in the sleep mode is lower than the threshold so as to inject the current to the compensation circuit.

6. The sleep mode control circuit of claim 1, wherein the threshold is lower than a level that the output signal will be such that the switching power supply system enters the sleep mode.

7. A sleep mode control method for a DC/DC switching power supply system including an error amplifier to provide an error signal on its output node, and a comparator to compare the error signal with an oscillating signal to produce an output signal on its output node, the sleep mode control method comprising the steps of:
   A. monitoring the output signal when the switching power supply is in a sleep mode; and
   B. pulling high the error signal to a target level when the output signal in the sleep mode is lower than a threshold.

8. The sleep mode control method of claim 7, wherein the step B comprises the step of injecting a current to the output node of the error amplifier.

\* \* \* \* \*